United States Patent
Suzuki et al.

(10) Patent No.: US 10,600,211 B2
(45) Date of Patent: Mar. 24, 2020

(54) SYSTEM AND METHOD FOR CALCULATING IMAGE SIMILARITY AND RECORDING MEDIUM

(71) Applicant: RICOH COMPANY, Ltd., Ohta-Ku (JP)

(72) Inventors: Toshihiro Suzuki, Kanagawa (JP); Satoshi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 156 days.

(21) Appl. No.: 15/673,543

(22) Filed: Aug. 10, 2017

(65) Prior Publication Data

US 2018/0061083 A1    Mar. 1, 2018

(30) Foreign Application Priority Data

Sep. 1, 2016  (JP) .................................. 2016-170974

(51) Int. Cl.
*G06T 7/90*     (2017.01)
*G06T 7/00*     (2017.01)
*G06T 5/00*     (2006.01)

(52) U.S. Cl.
CPC ................ *G06T 7/90* (2017.01); *G06T 5/005* (2013.01); *G06T 7/97* (2017.01); *G06T 2207/10024* (2013.01)

(58) Field of Classification Search
CPC .. G06T 7/90; G06T 7/97; G06T 5/005; G06T 2207/10024
See application file for complete search history.

(56) References Cited

U.S. PATENT DOCUMENTS

| | | | |
|---|---|---|---|
| 2007/0143272 A1 | 6/2007 | Kobayashi | |
| 2008/0092040 A1 | 4/2008 | Nakamura | |
| 2008/0235563 A1 | 9/2008 | Nakamura | |
| 2013/0027759 A1 | 1/2013 | Nakamura | |
| 2013/0135635 A1 | 5/2013 | Nakamura | |
| 2014/0149412 A1 | 5/2014 | Nakamura | |
| 2015/0002904 A1 | 1/2015 | Nakamura | |
| 2015/0139566 A1 | 5/2015 | Nakamura | |
| 2016/0189396 A1* | 6/2016 | Kwong | ................ G06K 9/4623 345/582 |

FOREIGN PATENT DOCUMENTS

| | | |
|---|---|---|
| JP | 2005-250972 | 9/2005 |
| JP | 2006-331460 | 12/2006 |
| JP | 2007-164648 | 6/2007 |

(Continued)

OTHER PUBLICATIONS

Hwang, Youngbae, et al. "Color transfer using probabilistic moving least squares." Proceedings of the IEEE conference on computer vision and pattern recognition. 2014. (Year: 2014).*

(Continued)

*Primary Examiner* — Menatoallah Youssef
(74) *Attorney, Agent, or Firm* — Xsensus LLP

(57) ABSTRACT

A system and method for calculating image similarity, each of which generates a retouch image using characteristic amounts relating to color, respectively obtained from a first image and a second image, and calculates similarity between the first image and the second image based on at least the retouch image.

15 Claims, 10 Drawing Sheets

INPUT IMAGE $I_i$

COLOR TRANSFER

RETOUCH IMAGE $I_i|^j$

REFERENCE IMAGE $I_j$

(56) References Cited

FOREIGN PATENT DOCUMENTS

| | | |
|---|---|---|
| JP | 2014-222429 | 11/2014 |
| JP | 2015-011585 | 1/2015 |
| JP | 2015-099546 | 5/2015 |
| JP | 2016-024499 | 2/2016 |
| WO | WO2005/086092 A1 | 9/2005 |

OTHER PUBLICATIONS

Michael J. Swain, et al., "Color indexing" International Journal of Computer Vision, Nov. 1991, vol. 7, Issue 1, pp. 11-32.

* cited by examiner

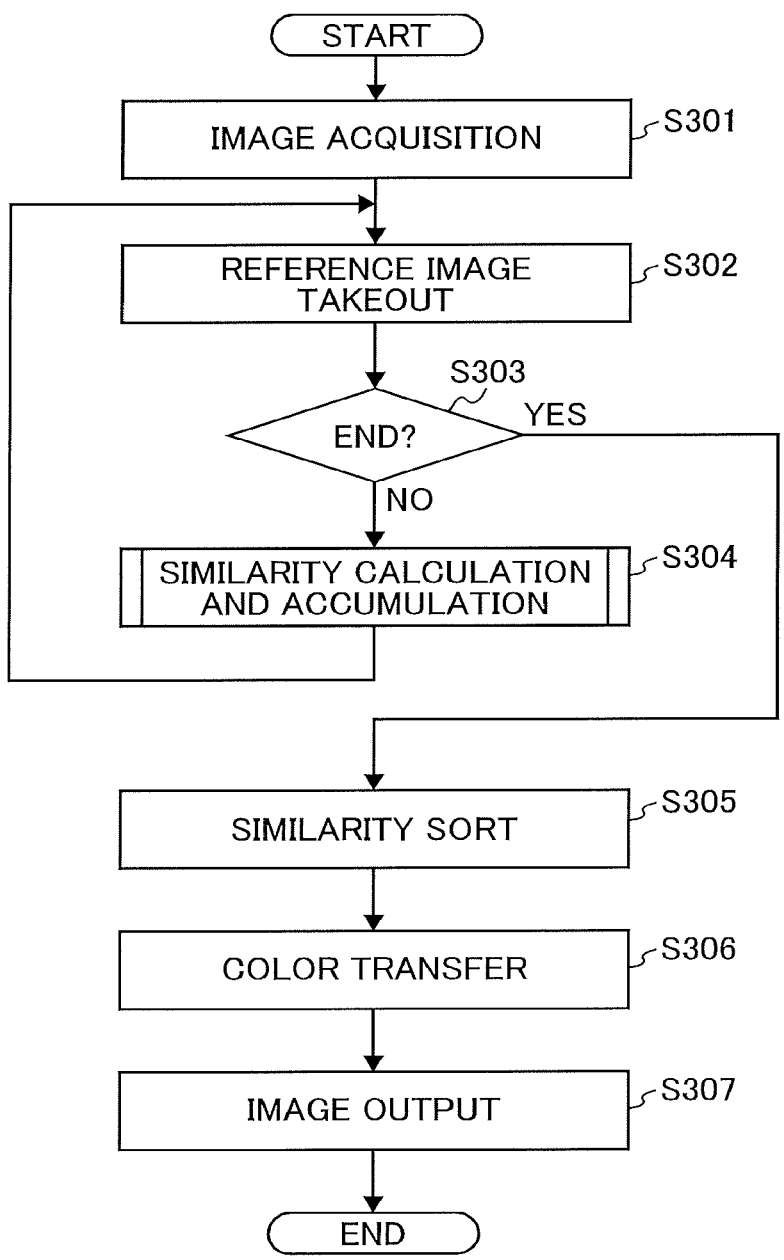

SYSTEM AND METHOD FOR CALCULATING IMAGE SIMILARITY AND RECORDING MEDIUM

CROSS-REFERENCE TO RELATED APPLICATIONS

This patent application is based on and claims priority pursuant to 35 U.S.C. § 119(a) to Japanese Patent Application No. 2016-170974, filed on Sep. 1, 2016, in the Japan Patent Office, the entire disclosure of which is hereby incorporated by reference herein.

BACKGROUND

Technical Field

The present invention relates to a system and method for calculating image similarity, and a recording medium.

Description of the Related Art

Conventionally, as methods for calculating similarity between images, basic methods using a mean squared error, a signal-to-noise (S/N) ratio, and the like are known. In addition, as other calculation methods, normalized cross-correlation of images, sum of squared differences (SSD) using the sum of squares of differences between pixel values at equal positions, sum of absolute differences (SAD) using the sum of absolute values of differences between pixel values at equal positions, and the like are known. In these methods, pixel values at corresponding positions on respective images are compared to calculate similarity between the images.

A further method is to create histograms of color information of images and compare the histogram image data to calculate similarity. In this method, the number of pixels of each color in each image is counted, and the more similar the percentage of the pixels of the color in one image is to the percentage of the pixels of the color in the other image, the higher the similarity is calculated to be.

SUMMARY

Example embodiments of the present invention include a system and method for calculating image similarity, each of which generates a retouch image using characteristic amounts relating to color, respectively obtained from a first image and a second image, and calculates similarity between the first image and the second image based on at least the retouch image.

Example embodiments of the present invention include a recording medium storing a control program for calculating image similarity.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 11 is a flowchart illustrating operation performed by the image processing apparatus according to the third embodiment.

Figure 1:
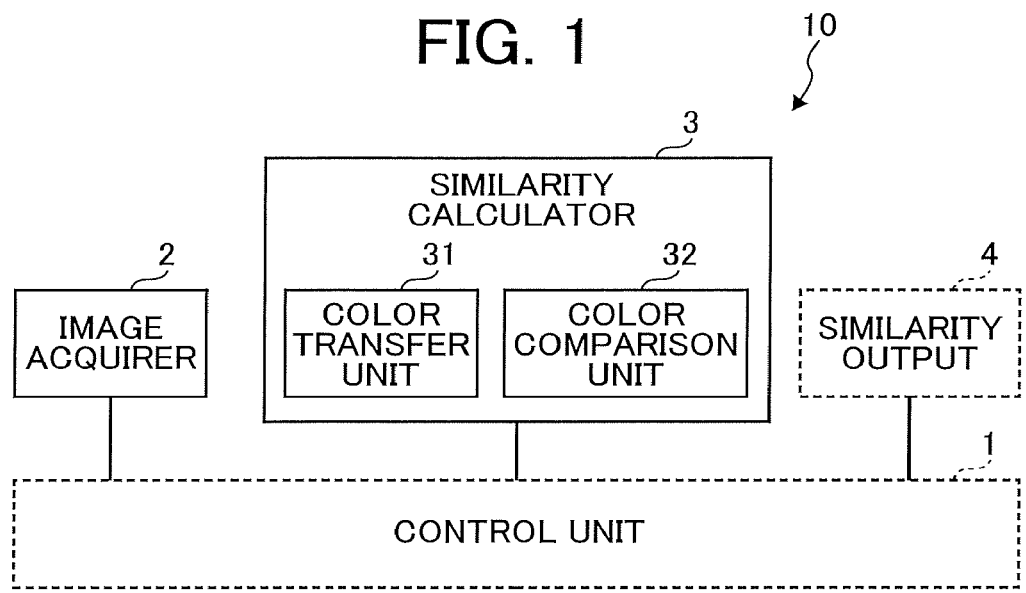
FIG. 1 is a functional block diagram illustrating arrangement of an image similarity calculation apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the conventional similarity calculation methods, consistency with similarity based on human intuition is not sufficient. For example, the mean squared error and the S/N ratio are measures with which, based on comparison between pixel values at corresponding positions in two images, differences of expression of the same picture are calculated. Accordingly, these measures are not suitable for comparison of images having different pictures and do not have sufficient consistency with similarity based on human intuition.

In a case in which image information is classified into picture and expression for convenience, the picture means what is shown in which position in which size, while the expression means variation obtained by normally retouching a picture.

Also, in the similarity calculation method using the histogram, an influence of the picture cannot completely be avoided. The reason for this is that the histogram uniformly simplifies the distribution of the pixel values. For example, in a case in which the percentage of a picture in one image is higher, the pixel values for the picture are denser, and the influence of the picture on similarity to be calculated is larger. That is, since the conventional similarity calculation method using the color histogram is influenced by picture, consistency of similarity to be calculated with similarity based on human intuition is not sufficient. Accordingly, a similarity calculation method in which pictures in images hardly influence the calculation and in which similarity to be calculated is consistent with similarity based on human intuition is desirable.

First Embodiment

First, referring to FIGS. 1 to 5, an image similarity calculation apparatus, an image processing apparatus, an image similarity calculation method, and a program according to a first embodiment of the present invention will be described.

FIG. 1 illustrates an arrangement example of an image similarity calculation apparatus 10 according to the present embodiment. The image similarity calculation apparatus 10 includes a control unit 1, an image acquirer 2, a similarity calculator 3, and a similarity output 4.

The control unit 1 is implemented by a central processing unit (CPU), a random access memory (RAM), and a read only memory (ROM) to perform various calculation and control. The image acquirer 2 acquires a plurality of items of image data including at least a first image and a second image. The image acquirer 2 then inputs an image to be processed into the similarity calculator 3. The image data may be acquired by the image acquirer 2 by means of direct acquisition from an image capturing apparatus or acquisition of captured data using a communication function.

Hereinafter, out of images acquired by the image acquirer 2, an image on an input side is referred to as an image $I_i$ while an image on a reference side is referred to as an image $I_j$. Pictures on the image $I_i$ and the image $I_j$ may be different from or the same as each other. In a case in which the image $I_i$ and the image $I_j$ are different in size from each other, the image $I_i$ and the image $I_j$ may be evenly sized.

The similarity calculator 3 calculates inter-image similarity based on at least the image $I_i$ serving as a first image and the image $I_j$ serving as a second image out of the images acquired by the image acquirer 2. The similarity calculator 3 includes a color transfer unit 31 and a color comparison unit 32.

Similarity calculation in the present embodiment is performed by comparing in terms of color the image $I_i$ with a retouch image $I_i^{j\prime}$ obtained by after-mentioned color transfer. The color transfer unit 31 includes a retouch image generator according to the present embodiment.

The color transfer unit 31 calculates respective characteristic amounts (features) of the image data of the image $I_i$ and the image $I_j$ in terms of color. The characteristic amount in the present description indicates a statistics amount such as an average value and variance of pixel values. Also, the pixel value indicates luminance in each pixel, a red-green-blue (RGB) value in a color space, or the like. The color transfer unit 31 performs color transfer, in which pixel values of the image are converted based on the calculated characteristic amounts of the image $I_i$ and the image $I_j$, to obtain the retouch image $I_i^{j\prime}$.

Figure 2:
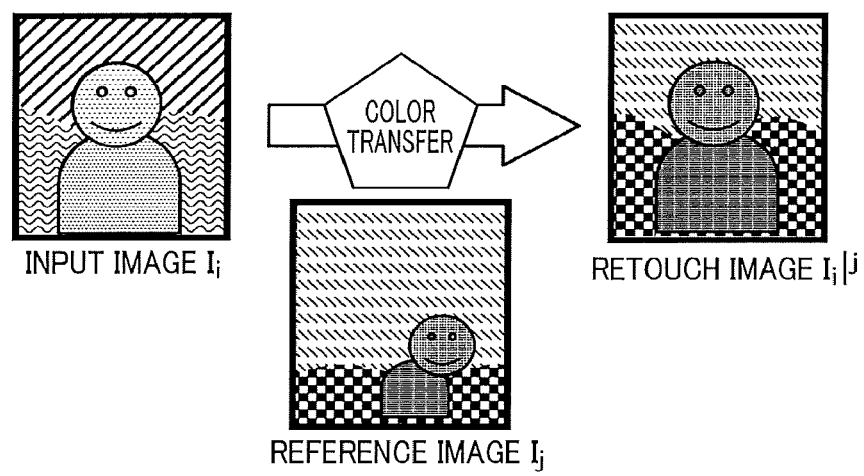
FIG. 2 is an illustration for explaining color transfer in the image similarity calculation apparatus according to the first embodiment.

Hereinafter, color transfer processing used in the present embodiment will be described in detail with reference to FIG. 2. The color transfer is processing in which color information of the image $I_j$ on the reference side is transferred into the image $I_i$ on the input side. As illustrated in FIG. 2, the color transfer unit 31 transfers color information of the image $I_j$ into the image $I_i$ to obtain the retouch image $I_i^{j\prime}$.

In the present description, the image $I_i$ is an original image to be processed in the color transfer and corresponds to a transfer destination. The image $I_j$ is an image to be referred to in the color transfer and corresponds to a transfer source. The retouch image $I_i^{j\prime}$ is an image obtained by color-transferring the image $I_i$ with use of the image $I_j$. The color information includes lightness (such as luminance or brightness) as well as hue and saturation, and there are various representation ways of the color information such as RGB, CMYK, YCrCb, HSV, Lab, and Lαβ.

The reason for using the color transfer to calculate similarity between images will be described.

Suppose that there are two images, the image $I_i$ and the image $I_j$, having different pictures, and that similarity between the two images is calculated. Even when the images are subject to normal color comparison, in which pixel values at equal positions are compared, the degree of similarity to be calculated does not match the degree of similarity based on human intuition since the images have different pictures. The normal color comparison is thus problematic in this case.

As illustrated in FIG. 2, the image $I_i$ and the image $I_j$ have different pictures. However, when the color transfer from the image $I_j$ to the image $I_i$ is performed, the retouch image $I_i^{j\prime}$ and the image $I_i$ have the same pictures.

When the retouch image $I_i^{j\prime}$ and the image $I_i$ obtained in this manner are subject to color comparison in which pixels at equal positions are compared, calculation of similarity between images that matches calculation based on human intuition can be performed without being influenced by pictures.

Specific processing of the color transfer will be described below, taking processing of color transfer in Lab color space as an example.

The color transfer unit 31 calculates $E(L_i)$, $E(a_i)$, and $E(b_i)$, which are averages, and $V(L_i)$, $V(a_i)$, and $V(b_i)$, which are variance values, of Lab values of the entire image $I_i$. Similarly, the color transfer unit 31 calculates $E(L_j)$, $E(a_j)$, and $E(b_j)$, which are averages, and $V(L_j)$, $V(a_j)$, and $V(b_j)$, which are variance values, of Lab values of the entire image $I_j$.

The color transfer unit 31 performs processing of bringing closer to each other characteristic amounts, which are statistics amounts of color distribution on the retouch image $I_i^{j\prime}$ and the image $I_j$.

Specifically, the color transfer unit 31 calculates per pixel $L_i'$, $a_i'$, and $b_i'$, which are Lab values of the retouch image $I_i^{j\prime}$, in accordance with Formulae (1) to (3) described below with use of the averages and the variance values of the Lab values of the image $I_i$ and the image $I_j$ calculated above and obtains pixel values of the color-transferred retouch image $I_i^{j\prime}$.

$$L_i' = (L_i - E(L_i)) \times V(L_j)/V(L_i) + E(L_j) \quad (1)$$

$$a_i' = (a_i - E(a_i)) \times V(a_j)/V(a_i) + E(a_j) \quad (2)$$

$$b_i' = (b_i - E(b_i)) \times V(b_j)/V(b_i) + E(b_j) \quad (3)$$

In the above example, although processing is performed with use of the averages and the variance values as statistics amounts of color distribution to bring color distribution of one image close to color distribution of the other image, similar processing may be performed with use of the averages and standard deviations. Also, processing of bringing cumulative histograms of respective images close to each other may be performed. Also, although description has been provided using the Lab color space as an example of a color space, another color space such as RGB, LMS, and IPT may be used to perform similar processing.

The color comparison unit 32 performs color comparison between the image data of the retouch image $I_i^{j'}$ generated in the color transfer unit 31 and the image data of the image $I_i$ with use of the pixel values to calculate similarity between the images. More specifically, the color comparison unit 32 performs processing of taking out each pair of pixel values at corresponding equal positions on the image $I_i$ and the retouch image $I_i^{j'}$, calculating the pixel values as a pair, and performing accumulation on the entire images.

The number of pixels in each image is referred to as (M, N), a pixel value of the image $I_i$ at a coordinate point (l, m) is referred to as $I_i$ (l, m), and a pixel value of the retouch image $I_i^{j'}$ at a coordinate point (l, m) is referred to as $I_i^{j'}$ (l, m). The pixel value is a scalar quantity in a case of a monochrome grayscale image and a vector quantity in a case of a color image. The centered dot "•" represents an inner product of a vector (a normal product in a case of the scalar quantity).

Normalized cross-correlation (cross-correlation coefficient) R of an image is given by Formula (4) described below, and the obtained normalized cross-correlation R represents similarity between images. The closer the normalized cross-correlation R is to 1, the higher the similarity between images becomes.

[Equation 1]

$$R = \sum_{m=0}^{N-1} \sum_{l=0}^{M-1} I_i(l,m) \cdot I_i^{j'} \quad (4)$$

$$(l,m) \Big/ \sqrt{\sum_{m=0}^{N-1}\sum_{l=0}^{M-1} I_i(l,m)^2 \times \sum_{m=0}^{N-1}\sum_{l=0}^{M-1} I_i^{j'}(l,m)^2}$$

To calculate similarity between images in the color comparison unit 32, an index other than the aforementioned normalized cross-correlation R may be calculated. Also, SSD, expressed as Formula (5), using the sum of squares of differences between pixel values such as luminance values at corresponding coordinate positions on the image $I_i$ and the image $I_j$, or SAD, expressed as Formula (6), using the sum of absolute values of differences between pixel values such as luminance values may be used. Alternatively, an index into which the SSD or the SAD is normalized by the number of pixels or the like may be used as an index for similarity. Note that, in these cases, the lower a calculated value is, the higher the similarity becomes.

[Equation 2]

$$SSD = \sum_{m=0}^{N-1} \sum_{l=0}^{M-1} (I_i(l,m) - I_i^{j'}(l,m))^2 \quad (5)$$

$$SAD = \sum_{m=0}^{N-1} \sum_{l=0}^{M-1} \|I_i(l,m) - I_i^{j'}(l,m)\| \quad (6)$$

The color comparison unit 32 may calculate similarity between images with use of another definitional formula as long as the formula is based on comparison between pixel values at corresponding pixel positions on the image $I_i$ and the image $I_j$. For example, an available method is to regard each color signal as a monochrome, derive normalized cross-correlation {Rr, Rg, Rb} individually, and finally perform a synthesis.

The color comparison unit 32 may not treat all of the color information evenly but may perform weighting in accordance with the application. For example, suppose that image signals given by RGB are converted in a Lab format, and that ΔL calculated based on the difference in a direction of lightness and Δab calculated based on the difference on a chromaticity plane are differently weighted and synthesized. To calculate ΔL and Δab, the aforementioned method (R, SSD, SAD, or the like) is used.

ΔL corresponds to the difference in lightness component. For example, in a case in which the difference in exposure at the time of image capturing is large, ΔL is high. Also, Δab corresponds to the difference in chromaticity (hue and saturation). For example, in a case in which color cast is significant, Δab is high. A similarity index Rw obtained with use of these values can be defined by Formula (7) described below. In this formula, w is a scalar quantity having a value ranging from 0.0 to 1.0 and a linearly-combined weighting parameter.

[Equation 3]

$$R_w = (1-w)\Delta L + w\Delta ab \quad (7)$$

In Formula (7), by adjusting the weight w, whether the difference in exposure or the difference in chromaticity is weighted can be determined appropriately in accordance with the application. That is, the closer the weight w is to 1, the further the difference in chromaticity is weighted. The closer the weight w is to 0, the further the difference in exposure is weighted.

As a modification example of the processing of the image similarity calculation apparatus 10 according to the present embodiment, an image acquired in the image acquirer 2 may be thumbnailed to reduce the size of the image data, and the color transfer and the color comparison may be performed with use of the thumbnailed image. This processing is similar to the aforementioned processing except the thumbnailing.

The reason for thumbnailing the image to reduce the size of the image data before similarity calculation is as follows. In a case in which image data having extremely large size is input in the image acquirer 2, this may cause a disadvantage in which an enormous amount of calculation is required. As a measure in the image acquirer 2 to avoid this disadvantage, the image is thumbnailed to reduce the size of image data to reduce processing load in similarity calculation.

Specifically, when the number of pixels on one side of an image is about 128, the number is sufficient and will not lose color information of an original image. Thus, when the number of pixels in the short side is reduced to about 128, the total number of pixels can be reduced, and the amount of processing for the color transfer and the color comparison can be restricted. It is to be noted that the value 128 is specified for the purpose of explanation and may be another value in consideration of entire calculation load.

The similarity output 4 stores a value for similarity between images calculated by the color comparison unit 32, outputs the value, and supplies the value to another system or the like.

The function of the image similarity calculation apparatus 10 according to the present embodiment can be achieved using software on a computer.

Figure 4:
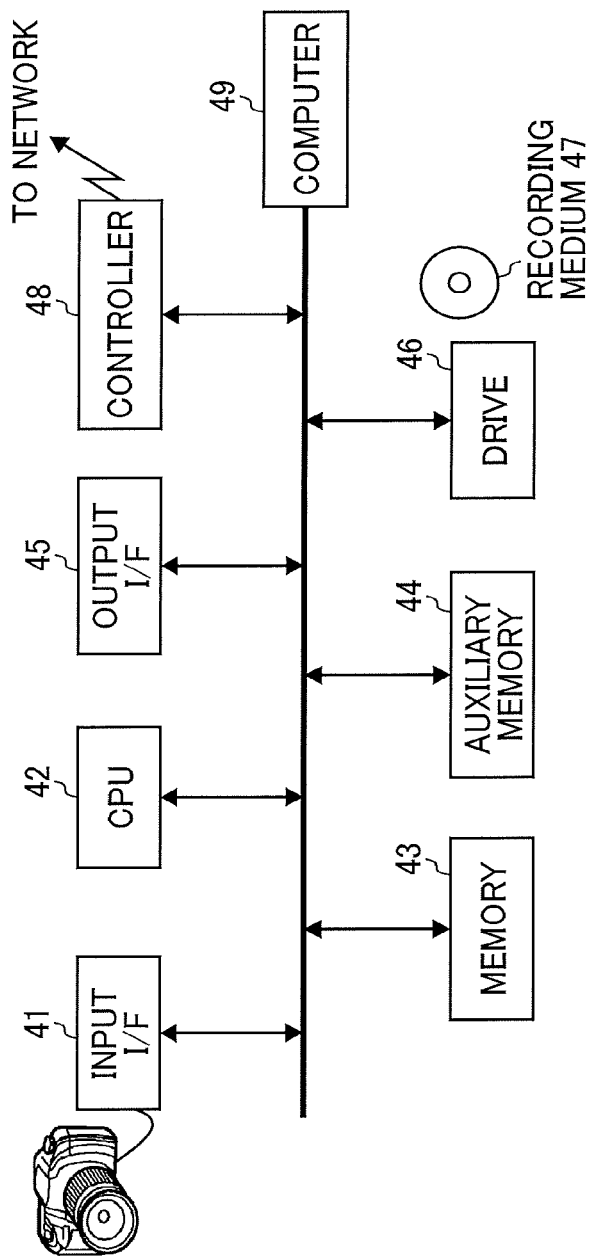
FIG. 4 is a functional block diagram illustrating a configuration example of a computer to which a recording medium according to the first embodiment has been applied.

FIG. 4 illustrates a configuration example of a computer 49 to which a program according to the present embodiment enabling image similarity to be calculated has been applied. A program recorded in a recording medium 47 such as a compact disk read only memory (CD-ROM) is read into an auxiliary memory 44 via a drive 46. The computer 49 is provided with data such as an image via an input interface (I/F) 41, and the data is output via an output I/F 45.

A CPU 42 configured to control operations of the computer 49 executes respective steps of the program while the CPU 42 communicates information to the auxiliary memory 44 and a memory 43 or cooperates with another computer via a network by means of a controller 48. Under such a configuration, the function of the present invention can be fulfilled as software.

Further, processing to be performed with a similarity calculation program may be performed using a plurality of computers, which may be distributed over a network.

Next, referring to FIG. 3, operation of calculating similarity, performed by the image similarity calculation apparatus 10, will be described according to an embodiment.

Figure 3:
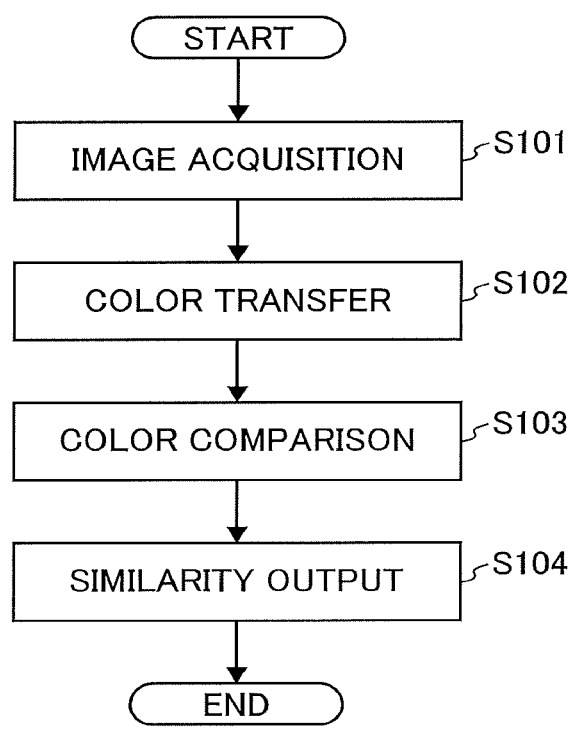
FIG. 3 is a flowchart illustrating operation performed by the image similarity calculation apparatus according to the first embodiment.

FIG. 3 is a flowchart illustrating operation of calculating similarity between images, performed by the image similarity calculation apparatus 10, according to the present embodiment.

The image acquirer 2 acquires a plurality of items of image data from outside (step S101). The color transfer unit 31 selects the image $I_i$ as a first image and the image $I_j$ as a second image from the images acquired in the image acquirer 2 and calculates characteristic amounts of the two images in terms of color. The color transfer unit 31 then performs color transfer, in which pixel values of the image $I_i$ are converted based on the characteristic amounts of the image $I_i$ on the input side and the image $I_j$ on the reference side, to generate the retouch image $I_i{}^{j'}$ (step S102).

The color comparison unit 32 performs color comparison between the image data of the retouch image $I_i{}^{j'}$ generated in the color transfer unit 31 and the image data of the image $I_i$ with use of the pixel values to calculate similarity between the images (step S103). The similarity output 4 stores the similarity between the images calculated by the color comparison unit 32, outputs the value, and supplies the value to another system or the like (step S104).

Figure 5:
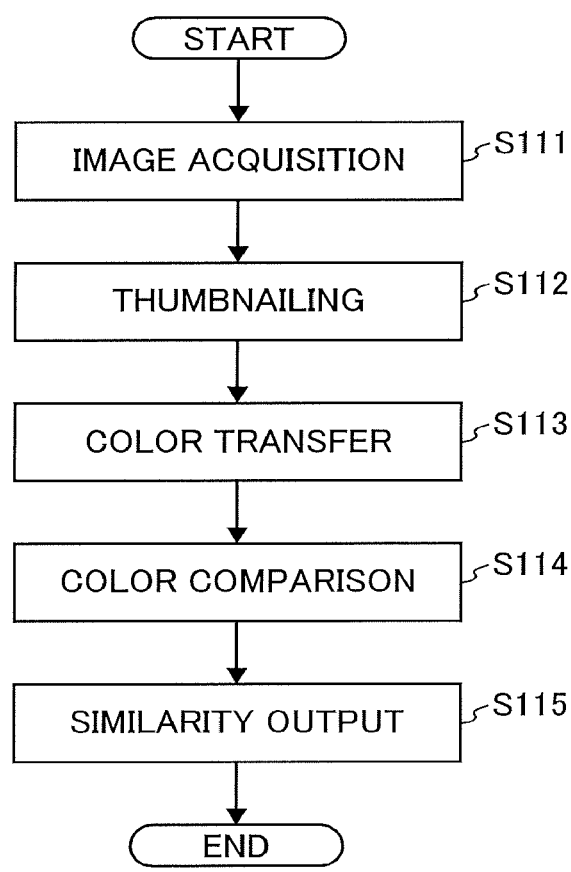
FIG. 5 is a flowchart illustrating operation performed by the image similarity calculation apparatus according to the first embodiment.

An operation in a case in which image data acquired in the image acquirer 2 is thumbnailed before the color transfer and the color comparison is illustrated in FIG. 5.

The image acquirer 2 acquires a plurality of items of image data from outside (step S111) and thumbnails the acquired image to reduce the size of the image data of the acquired image (step S112). Step S113 and the subsequent steps are similar to step S102 and the subsequent steps illustrated in FIG. 3.

As described above, the image similarity calculation apparatus 10 according to the present embodiment includes the image acquirer 2 that acquires a plurality of images, the similarity calculator 3 that calculates inter-image similarity based on the image $I_i$ and the image $I_j$ out of the plurality of images, the control unit 1, and the similarity output 4 that outputs similarity.

The similarity calculator 3 includes the color transfer unit 31 and the color comparison unit 32. The color transfer unit 31 selects one of the two images as the image $I_i$ and the other as the image $I_j$. The color transfer unit 31 then calculates respective average values and respective variance values, which are characteristic amounts in terms of color, of the two images. The color transfer unit 31 converts pixel values of the image $I_i$ with use of the average values and the variance values to generate the retouch image $I_i{}^{j'}$. The color comparison unit 32 performs color comparison between the retouch image $I_i{}^{j'}$ and the image $I_i$ with use of the pixel values to calculate similarity between the two images.

According to this arrangement, similarity can be calculated in a state in which the images have the same pictures.

Accordingly, dependency on the pictures in calculation of similarity between images can be decreased, and the degree of similarity to be calculated and the degree of similarity based on human intuition can be brought closer to each other and can highly be consistent with each other.

Also, when the similarity calculator 3 calculates similarity, the color comparison unit 32 may weight and synthesize the similarity calculated based on the color information of the retouch image $I_i{}^{j'}$ to calculate synthesized similarity. Further, the similarity calculator 3 may calculate similarity based on the difference between the color information of the retouch image $I_i{}^{j'}$ and the color information of the image $I_i$. The difference in terms of color information is the difference ΔL in the direction of lightness, the difference Δab in the direction of chromaticity, or the like in the Lab space.

According to this arrangement, the similarity can be adjusted in terms of the characteristic of the image such as lightness, hue, and saturation.

Also, the image acquirer 2 may reduce the size of the data of the acquired image, and the similarity calculator 3 may calculate similarity with use of the image data whose size has been reduced.

According to this arrangement, processing load in calculation of similarity between images can be reduced.

Second Embodiment

Next, referring to FIGS. 6 to 9, a second embodiment of the present invention will be described.

In calculation of similarity between images, the present embodiment is different from the first embodiment in terms of an image targeted for the color transfer, the numbers of times of the color transfer and the color comparison, and the like, and is basically similar to the first embodiment in terms of the other arrangement. Accordingly, similar or identical components to the components in the first embodiment illustrated in FIGS. 1 to 5 are labeled with the same reference numerals, and different points are particularly described.

The image similarity calculation apparatus 10 according to the present embodiment has similar arrangement to the arrangement of the first embodiment and includes the image acquirer 2, the similarity calculator 3, the similarity output 4, and the control unit 1 as illustrated in FIG. 1.

The difference of the present embodiment from the first embodiment in terms of a method for calculating similarity will be described with reference to FIGS. 6 to 8.

Figure 6:
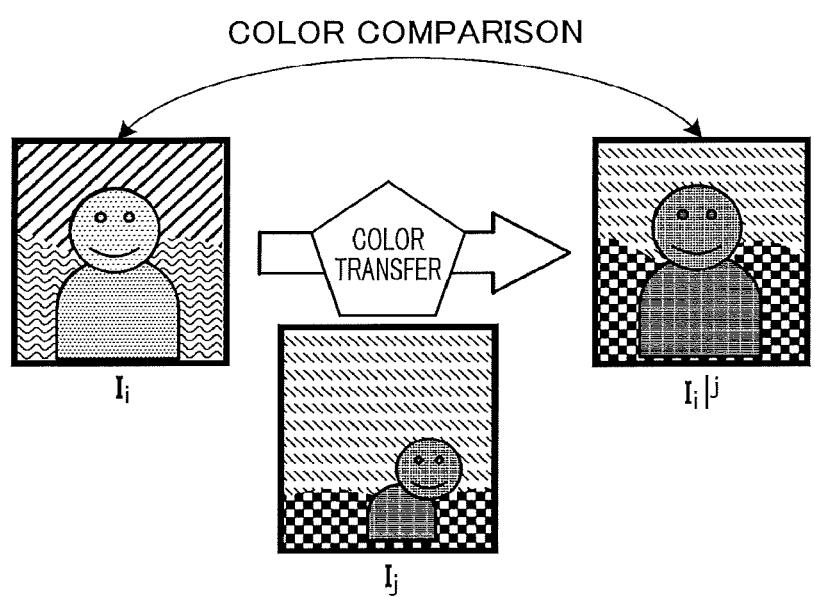
FIG. 6 is an illustration for explaining similarity calculation in the image similarity calculation apparatus according to the first embodiment.

FIG. 6 illustrates a method for calculating similarity according to the first embodiment. In this method, the color transfer unit 31 transfers color information of the image $I_j$ on the reference side into the image $I_i$ on the input side to generate the retouch image $I_i|^j$ having the same picture, and the color comparison unit 32 then performs color comparison between the image $I_i$ and the retouch image $I_i|^j$ to calculate similarity between the images.

Figure 7:
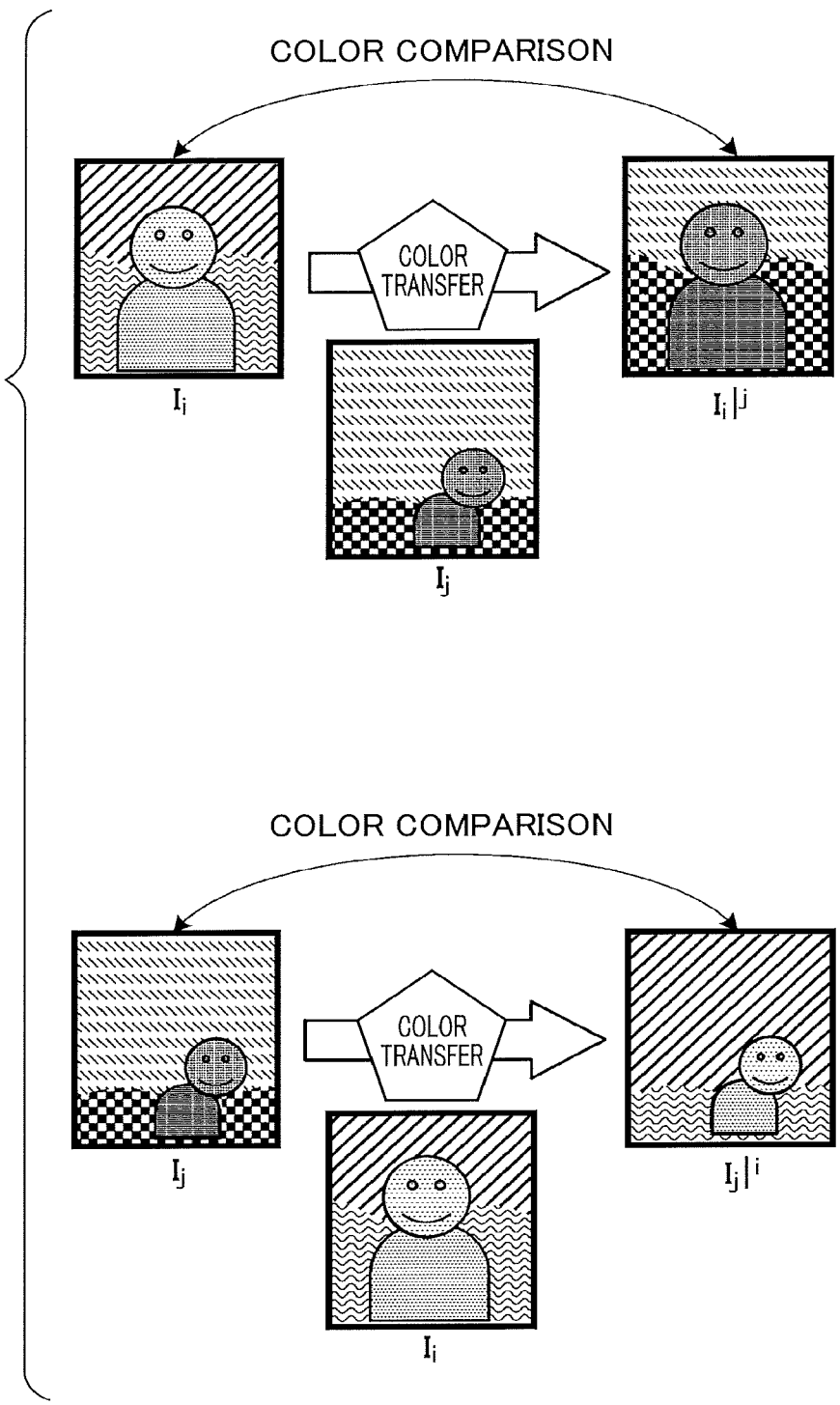
FIG. 7 is an illustration for explaining similarity calculation in the image similarity calculation apparatus according to a second embodiment.

FIG. 7 illustrates a method for calculating similarity according to the present embodiment. In this method, similarly to the first embodiment, the color transfer unit 31 transfers color information of the image $I_j$ on the reference side into the image $I_i$ on the input side to generate a first retouch image $I_i|^j$ having the same picture. Subsequently, the color comparison unit 32 performs color comparison between the image $I_i$ and the first retouch image $I_i|^j$ to calculate similarity between the images. The similarity obtained in this manner is referred to as similarity R1.

Subsequently, the color transfer unit 31 reverses an input image for a reference image and transfers color information of the image $I_i$ serving as the reference image into the image $I_j$ serving as the input image to obtain a second retouch image $I_j|^i$ having the same picture. Subsequently, the color comparison unit 32 performs color comparison between the second retouch image $I_j|^i$ and the image $I_j$ serving as the input image to calculate similarity between the images. The similarity obtained in this manner is referred to as similarity R2. A method for the color transfer performed here is similar to the method according to the first embodiment and is performed in accordance with Formulae (1) to (3) described above. Also, a method for the color comparison performed here is similar to the method according to the first embodiment and is performed in accordance with Formula (4) or Formulae (5) and (6) described above.

The color comparison unit 32 synthesizes the similarity R1 with the similarity R2 to calculate synthesized similarity, which is final similarity between image $I_i$ and image $I_j$. The synthesis here may be calculation of an average of the similarity R1 and the similarity R2 or another method.

The reason for performing the color transfer in the reverse direction and synthesizing the similarity values as illustrated in FIG. 7 will be described.

In general, the resulting value of the inter-image similarity calculated by "comparison between the image $I_i$ and the first retouch image $I_i|^j$" and the resulting value of the inter-image similarity calculated by "comparison between the image $I_j$ and the second retouch image $I_j|^i$") are not equal.

Accordingly, this causes a disadvantage in which the similarity between the two images differs depending on which of the two images for comparison serves as the input side or the reference side for the color transfer, and in which dependency on the order of the color transfer resides.

For example, in FIG. 7, since the area of the sky in the second retouch image $I_j|^i$ is overwhelmingly larger than the area of the sky in the first retouch image $I_i|^j$, the difference in color of the sky has a large influence on the final calculation results.

To solve such a disadvantage, in the present embodiment, the color transfer from the other image to one image is also performed, the color comparison is performed, and the similarity values are synthesized to obtain synthesized similarity. Accordingly, since dependency on the pictures at the time of the color comparison caused by the difference in order of the color transfer is alleviated, the influence of the dependency on the order of the color transfer on the color comparison can be eliminated.

Next, as another example of mutually performing the color transfer between images illustrated in FIG. 7, an example of further using a third image $I_x$ will be described with reference to FIG. 8.

In this method for calculating similarity, the color transfer unit 31 first obtains a third retouch image $I_x|^j$ having the same picture by means of the color transfer of the image $I_j$ on the reference side into the third image h on the input side.

The color transfer unit 31 then obtains a fourth retouch image $I_x|^i$ having the same picture by means of the color transfer of the image $I_i$ into the third image $I_x$. A method for the color transfer performed here is similar to the method according to the first embodiment and is performed in accordance with Formulae (1) to (3) described above. Also, a method for the color comparison performed here is similar to the method according to the first embodiment and is performed in accordance with Formula (4) or Formulae (5) and (6) described above.

The color comparison unit 32 performs color comparison between the third retouch image $I_x|^j$ and the fourth retouch image $I_x|^i$ to calculate similarity between the images.

Figure 8:
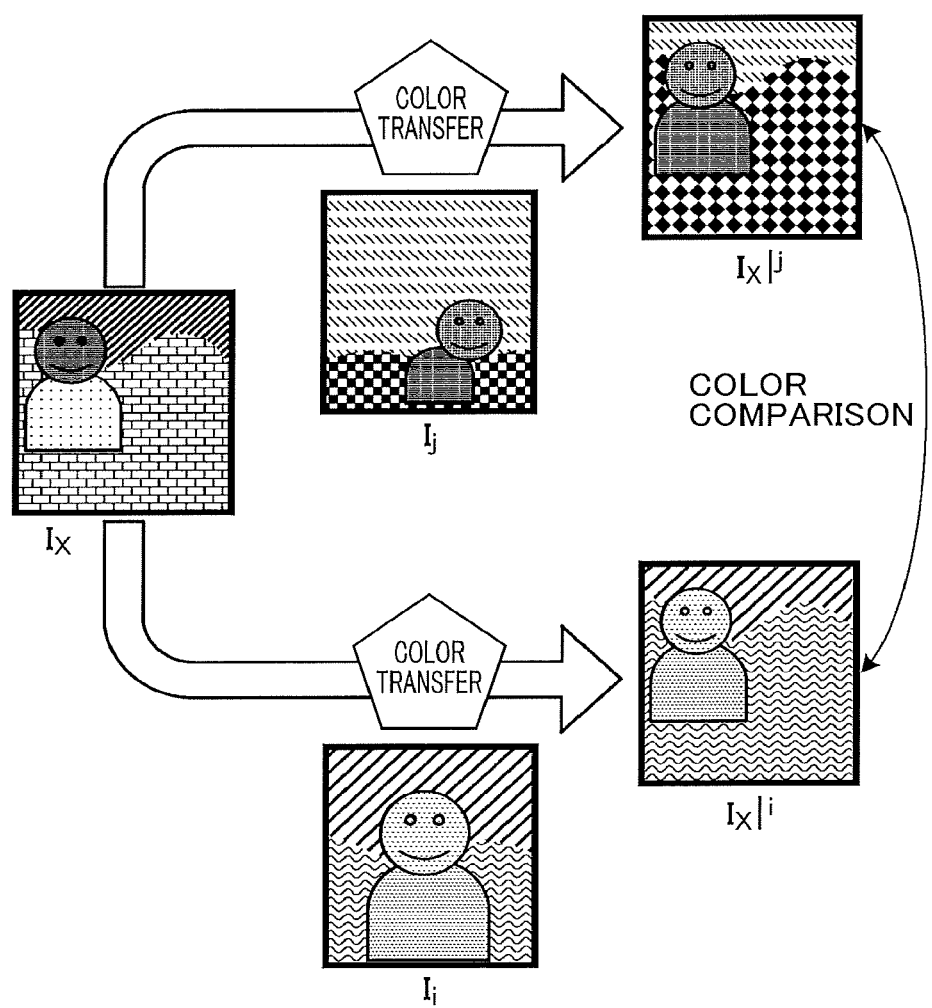
FIG. 8 is an illustration for explaining similarity calculation in the image similarity calculation apparatus according to the second embodiment.

The reason for performing the color transfer with use of the third image $I_x$ and synthesizing the similarity values as illustrated in FIG. 8 will be described.

For example, in FIG. 8, as the third image $I_x$, an image having a large-area background (ground) is used. In this case, the third retouch image $I_x|^j$ and the fourth retouch image $I_x|^i$ that have undergone the color transfer have the same pictures as the picture in the third image h. Since the area of the background (ground) in each of the third retouch image $I_x|^j$ and the fourth retouch image $I_x|^i$ is large, similarity on which the difference in background (ground) is reflected more greatly can be derived. By using the third image $I_x$ in this manner, the content of the similarity can be adjusted in accordance with the application.

Also, the third image $I_x$ is not necessarily limited to an image having a meaningful picture and can be an image having an appropriately-determined gradation pattern or the like. Thus, by increasing the number of pixels having chromaticity that is desired to be emphasized, an original similarity index can be defined.

Next, referring to FIG. 9, operation of calculating similarity, performed by the image similarity calculation apparatus 10, will be described according to an embodiment.

Figure 9:
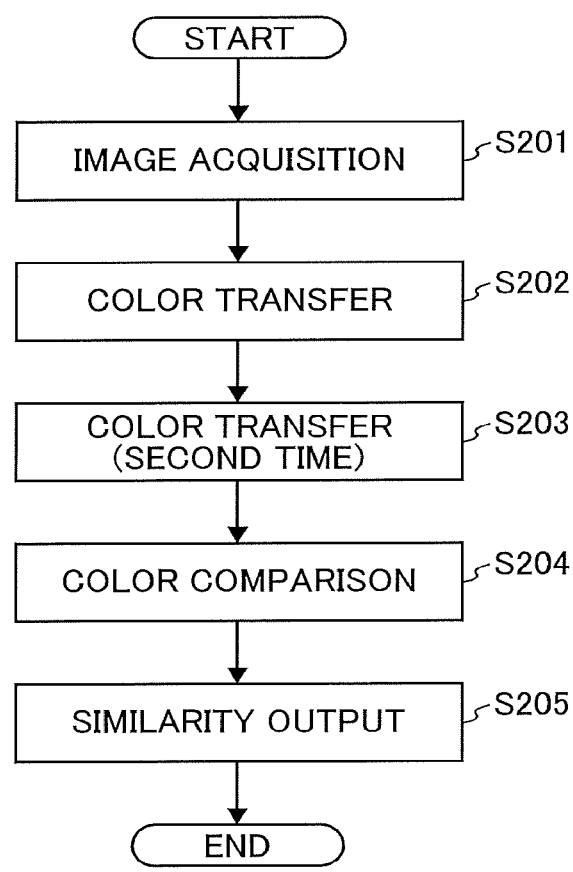
FIG. 9 is a flowchart illustrating operation performed by the image similarity calculation apparatus according to the second embodiment.

FIG. 9 is a flowchart illustrating operation of calculating similarity between images, performed by the image similarity calculation apparatus 10, according to the present embodiment.

First, processing of the similarity calculation pattern in FIG. 7 will be described. The image acquirer 2 acquires a plurality of items of image data from outside (step S201). The color transfer unit 31 selects the image $I_i$ and the image $I_j$ from the images acquired in the image acquirer 2 and calculates characteristic amounts (averages, variance values, and the like) of the two images in terms of color. The color transfer unit 31 then performs color transfer, in which pixel values of the image $I_i$ are converted based on the characteristic amounts of the image $I_i$ on the input side and the image $I_j$ on the reference side, to generate the first retouch image $I_i|^j$ (step S202).

The color comparison unit 32 performs color comparison between the first retouch image $I_i|^j$ generated in the color transfer unit 31 and the image $I_i$ with use of the pixel values to calculate the similarity R1 between the images (step S204).

Subsequently, to perform color transfer in the reverse direction from the direction of the color transfer, the color transfer unit 31 performs color transfer, in which pixel values of the image $I_j$ are converted based on the characteristic amounts of the image $I_i$ and the image $I_j$ calculated in step S202, to generate the second retouch image $I_j|^i$ (step S203).

The color comparison unit 32 performs color comparison between the image data of the second retouch image $I_j|^i$ generated in the color transfer unit 31 and the image data of the image $I_j$ with use of the pixel values to calculate the similarity R2 between the images (step S204). The color comparison unit 32 synthesizes (for example, calculates an average of) the similarity R1 with the similarity R2 to calculate synthesized similarity, which is final similarity between the image $I_i$ and the image $I_j$ (step S204).

The similarity output 4 stores the synthesized similarity between the images calculated by the color comparison unit 32, outputs the value, and supplies the value to another system or the like (step S205).

The similarity calculation pattern illustrated in FIG. 7 has been described with reference to the flowchart in FIG. 9, and the similarity calculation pattern illustrated in FIG. 8 can similarly be described in the following manner.

The image acquirer 2 acquires a plurality of items of image data from outside (step S201). The color transfer unit 31 selects the third image h and the image $I_j$ from the images acquired in the image acquirer 2 and calculates characteristic amounts (averages, variance values, and the like) of the two images in terms of color. The color transfer unit 31 then performs color transfer, in which pixel values of the third image $I_x$ are converted based on the characteristic amounts of the third image $I_x$ on the input side and the image $I_j$ on the reference side, to generate the third retouch image $I_x|^j$ (step S202).

Subsequently, to transfer color information of the image $I_i$ on the reference side into the third image $I_x$ on the input side, the color transfer unit 31 calculates characteristic amounts (averages, variance values, and the like) of the two images in terms of color. The color transfer unit 31 then performs color transfer, in which pixel values of the third image $I_x$ are converted based on the characteristic amounts of the third image $I_x$ and the image $I_i$, to generate the fourth retouch image $I_x|^i$ (step S203).

The color comparison unit 32 calculates similarity between the images based on the third retouch image $I_x|^j$ and the fourth retouch image $I_x|^i$ (step S204).

The similarity output 4 stores the synthesized similarity between the images calculated by the color comparison unit 32, outputs the value, and supplies the value to another system or the like (step S205).

As described above, the similarity calculator 3 of the image similarity calculation apparatus 10 according to the present embodiment calculates similarity in the following manner. First, the color transfer unit 31 transfers color information of the image $I_j$ to the image $I_i$ to generate the first retouch image $I_i|^j$ having the same picture. The color transfer unit 31 then transfers color information of the image data of the image $I_i$ to the image data of the image $I_j$ to generate image data of the second retouch image $I_j|^i$. Subsequently, the color comparison unit 32 performs color comparison between the image data of the first retouch image $I_i|^j$ and the corresponding image data of the image $I_i$ to calculate the similarity R1 between the images. Also, the color comparison unit 32 performs color comparison between the image data of the second retouch image $I_j|^i$ and the corresponding image data of the image to calculate the similarity R2 between the images. The similarity calculator 3 synthesizes the two similarity values R1 and R2 obtained by the color comparison unit 32 to calculate synthesized similarity between the image $I_i$ and the image $I_j$.

According to this arrangement, dependency on the pictures in calculation of similarity between images can be decreased, consistency with human intuition can be increased, and dependency on the order in similarity calculation can be decreased.

Also, the similarity calculator 3 of the image similarity calculation apparatus 10 according to the present embodiment calculates similarity in the following manner. First, the color transfer unit 31 transfers color information of the image data of the image $I_i$ into the third image $I_x$ acquired by the image acquirer 2 to generate image data of the fourth retouch image $I_x|^i$. The color transfer unit 31 also transfers color information of the image data of the image $I_j$ into the third image $I_x$ to generate image data of the third retouch image $I_x|^j$. Subsequently, the color comparison unit 32 calculates similarity between the images based on the third retouch image $I_x|^j$ and the fourth retouch image $I_x|^i$.

According to this arrangement, dependency on the pictures in calculation of similarity between images can be decreased, consistency with human intuition can be increased, and dependency on the order in similarity calculation can be decreased.

In this embodiment, as illustrated in FIG. 4, the image similarity calculation apparatus 10 may be installed with a program for calculating similarity to cause the CPU 42 to perform similarity calculation operation according to the program.

Third Embodiment

Next, referring to FIGS. 10 and 11, a third embodiment of the present invention will be described.

An image processing apparatus 20 according to the present embodiment uses the image similarity calculation apparatus 10 according to the first or second embodiment to perform the color transfer on an input image and automatically correct the image. Accordingly, similar or identical components to the components in the first and second embodiments illustrated in FIGS. 1 to 9 are labeled with the same reference numerals, and different points are particularly described.

Figure 10:
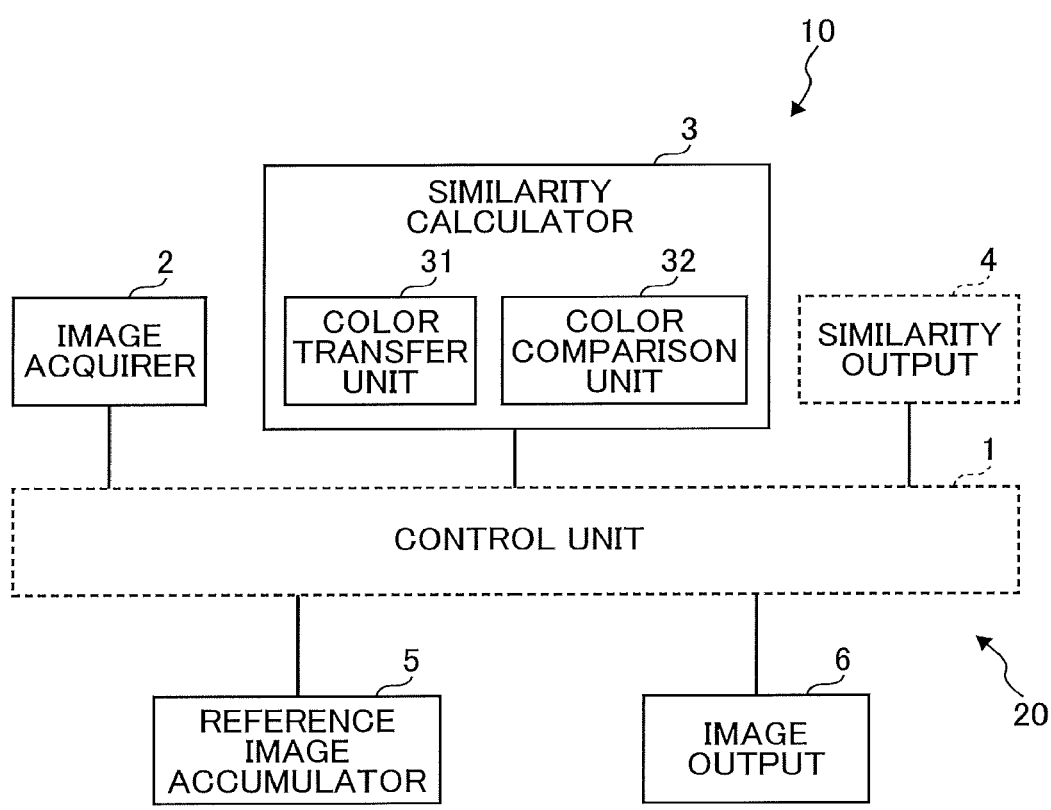
FIG. 10 is a functional block diagram illustrating arrangement of an image processing apparatus according to a third embodiment.

FIG. 10 illustrates an arrangement example of the image processing apparatus 20 according to the present embodiment. The image processing apparatus 20 includes the image similarity calculation apparatus 10 including the control unit 1, the image acquirer 2, the similarity calculator 3, and the similarity output 4, a reference image accumulator 5, and an image output 6.

The image acquirer 2 acquires a plurality of items of image data, and input the acquired image data as the input image $I_i$ to be processed. The image data may be acquired by means of direct acquisition from an image capturing apparatus or acquisition of captured data using a communication function. Alternatively, image data that is previously stored in a memory may be loaded.

The reference image accumulator 5 accumulates in advance one or more reference images to be referred to when the input image is subject to the color transfer to generate image data of a retouch image. The number of images to be accumulated is not limited to one, as a desired result of correcting the input image cannot be limited to one pattern.

For example, in a case of a portrait image, a plurality of reference images can be prepared to correspond to a variety of races. In a case of a room image for sale of real estate, a plurality of reference images can be prepared to correspond to a variety of colors of apartments.

The control unit 1 sequentially reads out reference images accumulated in the reference image accumulator 5. The control unit 1 accumulates information indicating similarity to the input image that the similarity calculator 3 has calculated using the reference image. The control unit 1 sorts pieces of similarity information accumulated and selects one of the reference images used to calculate the highest degree of similarity. This selected reference image is hereinafter referred to as a selected reference image $I_{Ref}$.

Similarity is calculated by the similarity calculator 3 in the method described in the first or second embodiment. Also, the similarity described here includes the synthesized similarity described in the second embodiment. The calculated similarity is stored in the similarity output 4.

The control unit 1 repeats the above processing, which is processing of reading out a reference image, accumulating similarity, and selecting a reference image with a high degree of similarity, as many times as the number of reference images, until there are no more reference images to be read out.

When the selected reference image $I_{Ref}$ is selected by the control unit 1, the color transfer unit 31 performs the color transfer on the input image $I_i$ to obtain a retouch image $I_i|^{Ref}$. The image output 6 displays the obtained retouch image $I_i|^{Ref}$ on the screen of the image processing apparatus 20 or outputs the obtained retouch image $I_i|^{Ref}$ by means of a printer or the like. Meanwhile, in a case in which a user does not like the result of the output retouch image $I_i|^{Ref}$ the user may select another reference image as the selected reference image $I_{Ref}$ by himself/herself.

Next, referring to FIG. 11, operation of processing image retouch, performed by the image processing apparatus 20, will be described. FIG. 11 is a flowchart illustrating operation of processing image retouch, performed by the image processing apparatus 20, according to the present embodiment.

The image acquirer 2 acquires the input image $I_i$ to be processed (step S301). The control unit 1 reads out images accumulated in the reference image accumulator 5 sequentially one by one (step S302). In a case in which the control unit 1 reads out a reference image (step S303), the control unit 1 causes the similarity calculator 3 to calculate similarity, accumulates the obtained similarity (step S304), and goes back to step S302 to read out a reference image again.

In a case in which there is no more image to be referred to in step S302, and in which the control unit 1 cannot read out any more reference image (step S303), the control unit 1 finishes the repetitive processing from reading out of a reference image to similarity calculation, sorts the accumulated pieces of similarity information, and selects the selected reference image $I_{Ref}$ that the similarity calculator 3 has used to calculate the highest degree of similarity (steps S305).

The color transfer unit 31 color-transfers the selected reference image $I_{Ref}$ that the control unit 1 has selected to the input image $I_i$ (step S306) to obtain the retouch image $I_i|^{Ref}$. Subsequently, the image output 6 outputs the obtained retouch image $I_i|^{Ref}$ via the screen or the like (step S307) and provides the image to the user.

As described above, the image processing apparatus 20 according to the present embodiment includes the image similarity calculation apparatus 10, the reference image accumulator 5 that accumulates reference images to be referred to at the time of generating a retouch image, and the image output 6. The similarity calculator 3 calculates similarity between the input image and the reference image using respective reference images accumulated in the reference image accumulator 5. The control unit 1 selects one of the reference images, which has been used to calculate the highest degree of similarity. The image output 6 outputs the retouch image obtained by transferring color information from the input image into the selected reference image.

This enables automatic correction of images, while reducing workload of the user.

As illustrated in FIG. 4, in this embodiment, the image processing apparatus 20 is installed with a control program for processing image retouch, which causes the CPU 42 to perform image retouch processing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A system for calculating image similarity, the system comprising:
   a memory to store a plurality of instructions; and
   processing circuitry configured to execute the plurality of instructions to:
      accumulate a plurality of reference images;
      generate a plurality of retouch images, each retouch image being generated by using characteristic amounts of color information obtained from a corresponding reference image and the input image to transfer the color information from the corresponding reference image to the input image;
      calculate, for each respective retouch image of the plurality of the retouch images, a similarity between the input image and the respective retouch image;
      select a retouch image, of the plurality of retouch images, that has a similarity to the input image that is higher than similarities calculated for a remainder of the retouch images of the plurality of retouch images; and
      output the retouch image.

2. The system of claim 1, wherein the processing circuitry is configured to calculate, as the similarity, a synthesized similarity by weighting and synthesizing similarity obtained based on color information of the retouch image.

3. The system of claim 1, wherein the processing circuitry is further configured to
   transfer color information from the input image to a reference image to generate a first retouch image,
   compare the first retouch image with the reference image to obtain a first inter-image similarity,
   compare the retouch image with the input image to obtain a second inter-image similarity, and
   synthesize the first inter-image similarity and the second inter-image similarity to obtain a synthesized similarity between the reference image and the input image to be used as the similarity between the reference image and the input image.

4. The system of claim 1, wherein the circuitry is further configured to transfer color information from the input image to another image to generate a second retouch image,
transfer color information from the reference image to the another image to generate a third retouch image, and
calculate a second similarity between the reference image and the input image based on the second retouch image and the third retouch image, to be used as the similarity between the first reference image and the input image.

5. The system of claim 1, wherein
the processing circuitry is further configured to
acquire a plurality of images, and
reduce a data size of at least one of the acquired images, and
at least one of the reference image and the input image is the at least one acquired image having a data size being reduced.

6. A method of calculating image similarity, the method comprising:
accumulating a plurality of reference images;
generating a plurality of retouch images, each retouch image being generated by using characteristic amounts of color information obtained from a corresponding reference image and the input image to transfer the color information from the corresponding reference image to the input image;
calculating, for each respective retouch image of the plurality of the retouch images, a similarity between the input image and the respective retouch image;
selecting a retouch image, of the plurality of retouch images, that has a similarity to the input image that is higher than similarities calculated for a remainder of the retouch images of the plurality of retouch images; and
outputting the retouch image.

7. The method of claim 6, wherein the calculating includes calculating, as the similarity, a synthesized similarity by weighting and synthesizing similarity obtained based on color information of the retouch image.

8. The method of claim 6, further comprising:
transferring color information from the input image to a reference image to generate a first retouch image;
comparing the first retouch image with the reference image to obtain a first inter-image similarity;
comparing the retouch image with the input image to obtain a second inter-image similarity; and
synthesizing the first inter-image similarity and the second inter-image similarity to obtain a synthesized similarity between the reference image and the input image to be used as the similarity between the reference image and the input image.

9. The method of claim 6, further comprising:
transferring color information from the input image to another image to generate a second retouch image; and
transferring color information from the reference image to the another image to generate a third retouch image, wherein
the calculating includes calculating a second similarity between the reference image and the input image based on the second retouch image and the third retouch image, to be used as the similarity between the reference image and the input image.

10. The method of claim 6, further comprising:
acquiring a plurality of images; and
reducing a data size of at least one of the acquired images, wherein
at least one of the reference image and the input image is the at least one acquired image having a data size being reduced.

11. A non-transitory recording medium which, when executed by one or more processors, cause the processors to perform a method of calculating image similarity, the method comprising:
accumulating a plurality of reference images;
generating a plurality of retouch images, each retouch image being generated by using characteristic amounts of color information obtained from a corresponding reference image and the input image to transfer the color information from the corresponding reference image to the input image;
calculating, for each respective retouch image of the plurality of the retouch images, a similarity between the input image and the respective retouch image;
selecting a retouch image, of the plurality of retouch images, that has a similarity to the input image that is higher than similarities calculated for a remainder of the retouch images of the plurality of retouch images; and
outputting the retouch image.

12. The non-transitory recording medium of claim 11, wherein the calculating includes calculating, as the similarity, a synthesized similarity by weighting and synthesizing is similarity obtained based on color information of the retouch image.

13. The non-transitory recording medium of claim 11, wherein the method further comprises:
transferring color information from the input image to a reference image to generate a first retouch image;
comparing the first retouch image with the reference image to obtain a first inter-image similarity;
comparing the retouch image with the input image to obtain a second inter-image similarity; and
synthesizing the first inter-image similarity and the second inter-image similarity to obtain a synthesized similarity between the reference image and the input image to be used as the similarity between the reference image and the input image.

14. The non-transitory recording medium of claim 11, wherein the method further comprises:
transferring color information from the input image to another image to generate a second retouch image; and
transferring color information from the reference image to the another image to generate a third retouch image, wherein
the calculating includes calculating a second similarity between the reference image and the input image based on the second retouch image and the third retouch image, to be used as the similarity between the reference image and the input image.

15. The non-transitory recording medium of claim 11, wherein the method further comprises:
acquiring a plurality of images; and
reducing a data size of at least one of the acquired images, wherein
at least one of the reference image and the input image is the at least one acquired image having a data size being reduced.

* * * * *